United States Patent [19]
Monahan

[11] Patent Number: 5,973,051
[45] Date of Patent: Oct. 26, 1999

[54] MASS LOADED COATING AND METHOD FOR REDUCING THE RESONANT FREQUENCY OF A CERAMIC DISC

[75] Inventor: Patrick J. Monahan, Gales Ferry, Conn.

[73] Assignee: The United States of America as represented by the Secretary of the Navy, Washington, D.C.

[21] Appl. No.: 08/127,178

[22] Filed: Sep. 27, 1993

[51] Int. Cl.$^6$ .............................. C08J 3/00; C08K 3/20; C08L 75/00; H04R 31/00

[52] U.S. Cl. .......................... 524/440; 29/594; 29/609.1; 427/372.2; 427/384; 427/386; 427/393.6; 428/423.1; 428/425.9; 524/439; 524/589; 524/590; 524/779; 524/780; 524/783

[58] Field of Search ..................................... 524/439, 440, 524/779, 780, 783, 589, 590; 428/423.1, 425.9; 29/594, 609.1; 427/372.2, 384, 386, 393.6

[56] References Cited

U.S. PATENT DOCUMENTS 4,079,162  3/1978  Metzger ................................ 524/589
5,278,219  1/1994  Lilley et al. .

*Primary Examiner*—Patrick D. Niland
*Attorney, Agent, or Firm*—Michael J. McGowan; Prithvi C. Lall; Michael F. Oglo

[57] ABSTRACT

A mass-loaded coating includes a predetermined mass of powdered lead which is mixed preferably in a ratio of 3:1 with a liquid polyurethane primer. When painted onto the surface of a disc or plate, the coating mass-loads the disc and lowers the resonant frequency of the disc without significantly increasing the physical dimensions of the disc. Thicker consistency adhesives, such as spreadable paste adhesives or thick putty-like adhesives may be substituted for mass-loading objects having irregular surface textures or complex shapes.

10 Claims, 1 Drawing Sheet

5,973,051

MASS LOADED COATING AND METHOD FOR REDUCING THE RESONANT FREQUENCY OF A CERAMIC DISC

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The instant invention relates to acoustic damping of rigid plates and more particularly to a mass-loaded coating for reducing the resonant frequency of a ceramic disc in an acoustic transducer.

(2) Description of the Prior Art

Acoustic transducers have heretofore been known in the art. In this connection, an acoustic transducer of the general type contemplated herein is described in detail in the technical memorandum "Modification (XU1643U) of the XU1643 Transducer", Naval Underwater Systems Center, New London Laboratory (1984). The XU1643U transducer includes three ceramic bimorph discs which are assembled in a mounting fixture referred to as a triple lollipop projector. Each of the ceramic bimorphs is individually encapsulated in polyurethane, and each has a slightly different resonant frequency. In order for the projector to function properly, all three ceramic bimorphs must be acoustically matched so that they all have nearly the same resonant frequency. One known method of acoustic matching is mass-loading the bimorphs whose resonant frequency is too high, i.e., the process of adding mass to an object to dampen the resonant frequency thereof. Conventional mass-loading techniques comprise affixing prefabricated damping elements, such as tiles or weights, to an object to add mass to the object, however, the ceramic transducer discs pose a special problem in that the ceramic discs are mounted in very close proximity, and the conventional damping elements do not fit within the predetermined size constraints of the mounting fixture. It has thus been found that these ceramic transducer elements do not readily lend themselves to conventional mass-loading techniques.

SUMMARY OF THE INVENTION

The instant invention provides a mass-loaded coating which is operative for mass-loading a ceramic disc without significantly increasing the physical dimensions of the disc. The mass-loaded coating of the instant invention comprises a predetermined mass of powdered lead which is mixed with a liquid adhesive matrix preferably in a ratio of 3:1. When the mass-loaded coating is painted onto the surfaces of the disc, it mass-loads the disc and effectively reduces the resonant frequency of the disc without significantly increasing the physical dimensions thereof. In order to coat objects having complex shapes or irregular surface textures, the liquid adhesive matrix may be replaced with either a spreadable paste adhesive or a thick putty-like adhesive. The paste and/or putty adhesives conform more easily and adhere to complex shapes and irregular surface textures so that the coating may be applied in an even thickness without running and/or pooling, such as may occur with a liquid adhesive matrix.

Accordingly, it is an object of the instant invention to provide a mass-loaded coating which is effective for reducing or damping the resonant frequency of a rigid disc without significantly increasing the physical dimensions of the disc.

It is another object to provide a mass-loaded coating which can be applied to the surface of an irregularly shaped object.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
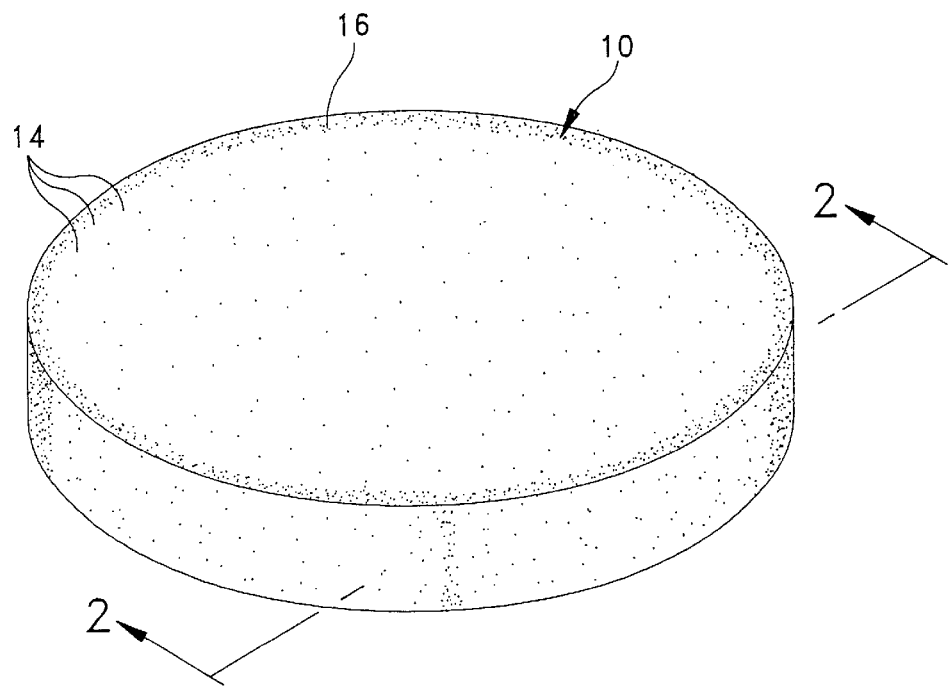
FIG. 1 is a perspective view of a ceramic disc which is coated with the mass-loaded coating of the instant invention.
Figure 2:
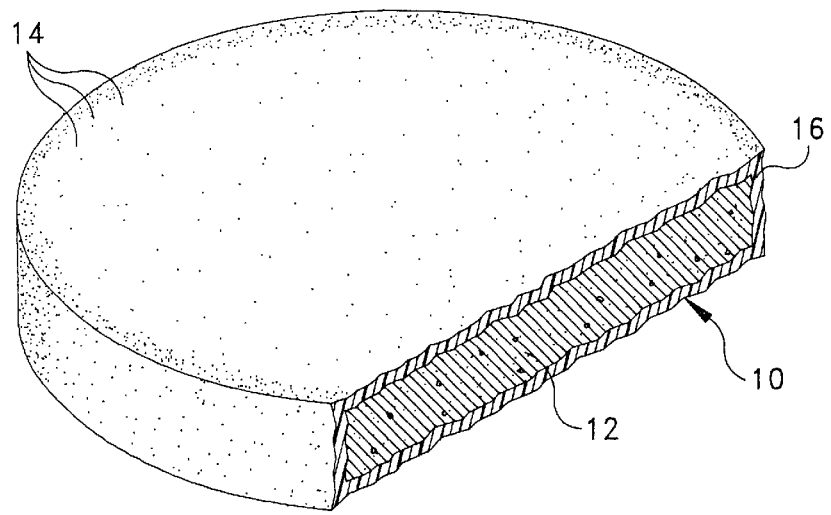
FIG. 2 is a cross-sectional view thereof taken along line 2—2 in FIG. 1.

Referring now to the drawings, the preferred embodiment of the mass-loaded coating of the instant invention is illustrated and generally indicated at 10 in FIGS. 1 and 2. As will hereinafter be more fully described, the instant coating 10 is effective for reducing the resonant frequency of a ceramic transducer disc generally indicated at 12 without significantly increasing the physical dimensions of the disc 12. The mass-loaded coating 10 comprises a predetermined mass of a dense, granular weighting material 14, such as powdered lead, which is mixed in a ratio of approximately 3:1 with a liquid adhesive matrix, such as urethane primer PR-420 16. It is pointed out that "powdered" weighting materials 14 are preferred because they are easily mixed with the adhesive matrix 16, and are evenly distributed therethrough. Lead is identified as the preferred weighting material because of its high density, however, other highly dense materials can be readily substituted if desired. It is also pointed out that other liquid adhesives may be substituted for the urethane primer 16 if desired. The type of weighting material 14 and adhesive matrix 16 is dependent upon the desired amount of mass to be added to the disc and the type of surface upon which the coating 10 is to be applied. For example, a urethane primer is the preferred adhesive in the instant embodiment because the ceramic disc 12 is encapsulated in urethane.

The mixed coating 10 is painted onto the outer surfaces of the ceramic disc 12 with a brush so as to form a uniform thin coating thereon. The adhesive matrix 16 is then allowed to cure to a hardened state according to its curing specifications. To insure that the coating 10 will adhere properly to the surfaces of the ceramic disc 12, the surfaces of the disc 12 must be cleaned and prepared according to the requirements of the adhesive matrix 16, i.e., the urethane primer. A second application of the coating 10 is recommended in most situations to obtain a maximum reduction in resonant frequency. However, it has been found that additional applications (more than 2) do not produce any further reductions in frequency. (This is most likely due to the compliance of the matrix in thicker coatings.) It can thus be seen that the instant coating 10 is effective for mass-loading the ceramic disc 12 and for reducing the resonant frequency of the disc 12 without significantly increasing the physical dimensions of the disc 12.

The concept of the invention can also be used to mass-load complex shaped objects and irregular surface textures which do not readily lend themselves to conventional damping procedures. In order to apply the coating 10 to complex shaped objects and irregular surface textures, the liquid adhesive matrix may be replaced with a thicker consistency adhesive, such as a spreadable paste adhesive or a thick putty-like adhesive. The paste and/or putty adhesives more easily conform and adhere to complex shaped objects and irregular surface textures so that the coating is applied in an even thickness without running or pooling such as may occur with a liquid adhesive. For example, an object having a rough or irregular surface would be mass-loaded with a coating having a paste-like consistency. The paste coating would be applied using a trowel or other instrument to spread the coating evenly over the surface. A complex shaped object would be mass-loaded using a thicker putty-like coating which could be molded around the irregular shape.

It is seen therefore that the instant invention provides an effective mass-loaded coating for reducing the resonant frequency of a rigid element. In the preferred embodiment, the mass-loaded coating comprises a predetermined mass of powdered lead which is mixed with a liquid adhesive matrix and the mixed coating is applied to the surface of a ceramic transducer disc wherein it is effective for reducing the resonant frequency of the disc without significantly increasing the physical dimensions of the disc. In alternative embodiments, the liquid adhesive matrix is replaced with a thicker consistency adhesive matrix, such as a spreadable paste adhesive or a thick putty-like adhesive for application to irregular surface textures and complex shaped objects. For these reasons, it is believed that the mass-loaded coating of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A mass-loaded coating for reducing the resonant frequency of a rigid element comprising:
    an adhesive matrix; and
    a predetermined mass of a dense granular weighting material which is mixed with said adhesive matrix in a ratio of approximately 3:1 by mass.

2. In the mass-loaded coating of claim 1, said adhesive matrix comprising a liquid adhesive.

3. In the mass-loaded coating of claim 1, said adhesive matrix comprising a paste adhesive.

4. In the mass-loaded coating of claim 1, said adhesive matrix comprising a putty-like adhesive.

5. In the mass-loaded coating of claim 2, said liquid adhesive comprising a polyurethane primer.

6. In the mass-loaded coating of claim 1, said dense, granular weighting material comprising powdered lead.

7. A mass-loaded coating for reducing the resonant frequency of a rigid plate comprising:
    a liquid urethane primer; and
    a predetermined mass of powdered lead which is mixed with said urethane primer in a ratio of approximately 3:1 by mass.

8. A method of reducing the resonant frequency of a rigid element comprising the steps of:
    applying a layer of an uncured adhesive matrix over an outer surface of said rigid element, said adhesive matrix including a predetermined mass of a dense, granular weighting material which is mixed with said adhesive matrix in a ratio of approximately 3:1 by mass; and
    curing said adhesive matrix to a hardened state wherein said coating mass-loads said rigid element and reduces the resonant frequency thereof.

9. The method of claim 8 further comprising the step of applying a second layer of said mass-loaded coating to said rigid element.

10. A method of reducing the resonant frequency of a ceramic disc of an acoustic transducer comprising the steps of:
    applying a layer of an uncured adhesive matrix over an outer surface of said ceramic disc, said adhesive matrix including a predetermined mass of a dense granular weighting material which is mixed with said adhesive matrix in a ratio of about 3 parts weighting material to about 1 part adhesive matrix by mass; and
    curing said adhesive matrix to form a substantially rigid outer coating on said ceramic disc.

* * * * *